United States Patent [19]

Puretic

[11] 4,103,792

[45] Aug. 1, 1978

[54] FISH UNLOADING SYSTEM

[76] Inventor: Mario J. Puretic, 259 6th Ave. North, Tierra Verde, Fla. 33715

[21] Appl. No.: 762,854

[22] Filed: Jan. 27, 1977

[51] Int. Cl.² .............................................. B63B 35/14
[52] U.S. Cl. .................................... 214/152; 214/15 B
[58] Field of Search ...................... 214/14, 15 R, 15 B, 214/152; 114/26, 27

[56] References Cited

U.S. PATENT DOCUMENTS

| 268,710 | 12/1882 | Moore | 214/15 B |
| 1,028,387 | 6/1912 | Roberson | 214/15 B X |
| 1,337,279 | 4/1920 | Sensibar | 214/15 B |
| 3,625,383 | 12/1971 | Puretic | 214/15 B X |
| 3,795,325 | 3/1974 | McLean | 214/15 B X |

FOREIGN PATENT DOCUMENTS 1,318,892  1/1963  France .................................. 214/15 B

*Primary Examiner*—Frank E. Werner
*Attorney, Agent, or Firm*—Fulwider, Patton, Rieber, Lee & Utecht

[57] ABSTRACT

A fish unloading system for removing fish from the main fish hold of a fishing boat. The lower portion of the main fish hold is filled with water and sufficient salt added to cause the fish to float near the surface of the water. A power-operated self-feeding fish-impelling device having an enclosure arranged in a loop with a discharge aperture formed in its upper portion is lowered into the hold. A plurality of blades or baskets are power driven about the interior of the enclosure. A pump is arranged with its suction in communication with the fish-impelling device to continuously draw water and fish towards the blades or baskets of the impeller so as to continuously propel fish upwardly from the hold.

The system is utilized to unload a plurality of auxiliary fish holds connected to the main fish hold by access hatches. Fish in the auxiliary holds are floated through the access hatches by a recirculating flow of water from the main fish hold through the auxiliary holds and back into the main hold.

14 Claims, 12 Drawing Figures

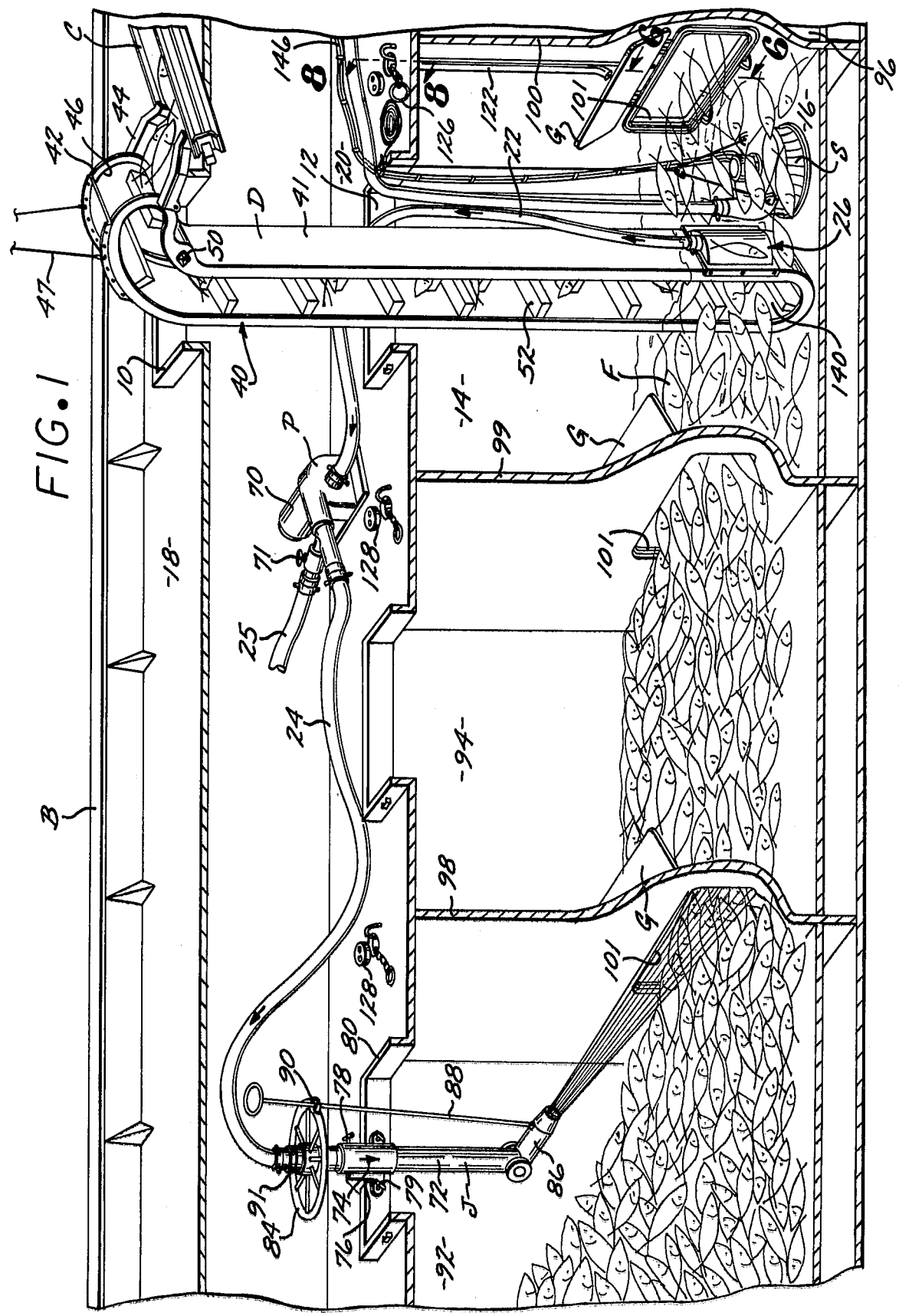

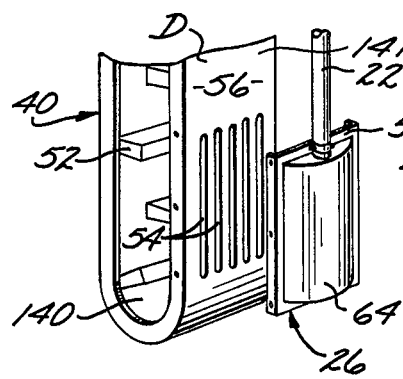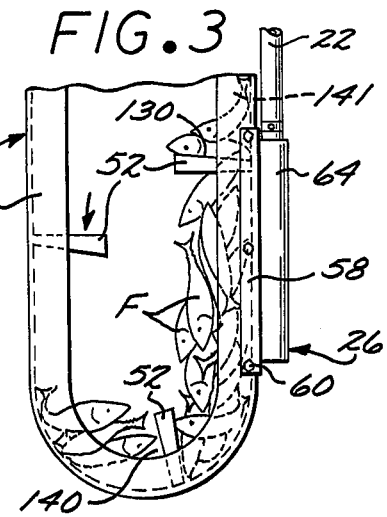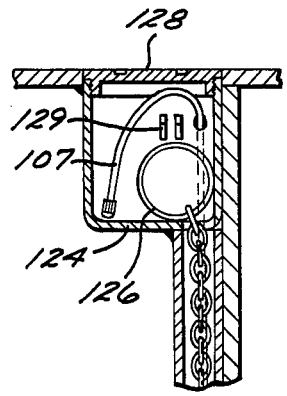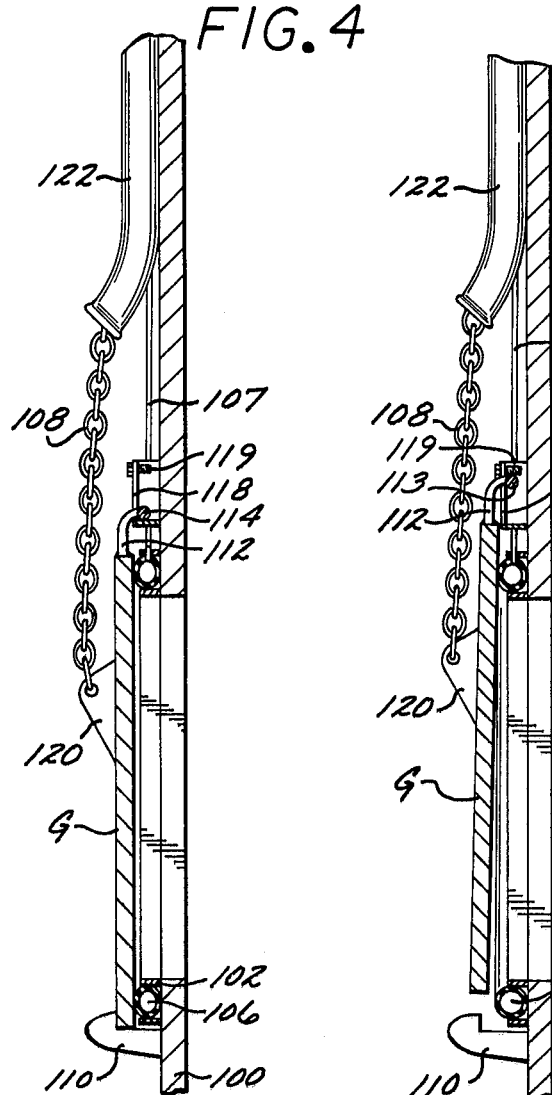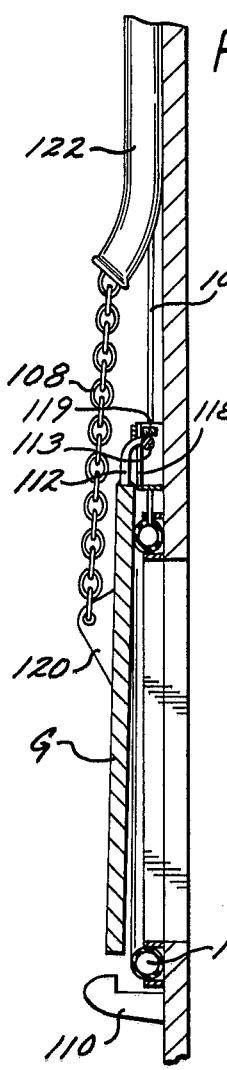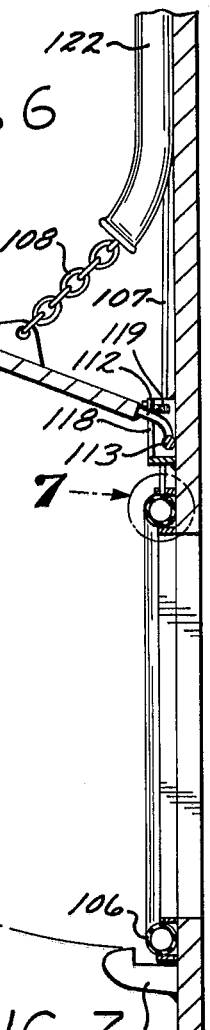

FISH UNLOADING SYSTEM

BACKGROUND OF THE INVENTION

1. Field of the Invention

The present invention relates generally to the art of fishing and more particularly to a novel system for unloading fish from the holds of a fishing boat.

2. Description of the Prior Art

Although fishing is one of the oldest arts, comparatively little has been done over the years to change the apparatus and methods that have been utilized in unloading fish from the holds of a fishing boat. Generally, fish are unloaded by means of a large bucket that is suspended from a hoist. Prior to the unloading operation the brine is removed from the holds. Thereafter, a crew of laborers descend into the main fish hold and handload the bucket with fish. The loaded bucket is then raised through the hatch to the deck or to a dock. After the main fish hold has been emptied of fish, hatches connecting the main fish hold with adjoining auxiliary holds are removed. Fish from the auxiliary holds are then manually moved into the main hold for removal by the bucket. This unloading operation involves several disadvantages. Thus, it requires a comparatively large number of workmen. The conditions within the fish holds are extremly uncomfortable. The unloading operation requires many hours, with a resultant expensive tie-up time of the boat. Moreover, the workmen bruise and thereby damage the fish by contact with their feet. Where small fish are unloaded it is possible to pump the fish from the hold. This system, however, is only usable with smaller fish and the fish are generally rendered unfit for human consumption.

In my U.S. Pat. No. Re. 28,186, there is disclosed a system for removing fish from the hold of a fishing boat utilizing a power-operated fish-impelling device having an enclosure arranged in a loop and including a power-driven plurality of blades. Water is admitted to the lower portion of the fish-filled hold and the salinity of such water is adjusted to cause the fish to float near the surface of the water. The fish then enter the fish-impelling device and are engaged by the moving blades thereof so as to be continuously propelled upwardly from the hold.

SUMMARY OF THE INVENTION

It is a major object of the present invention to provide a fish unloading system generally similar to that disclosed in my aforementioned U.S. Pat. No. Re. 28,186. However, the system of my present invention affords more positive movement of the fish towards the fish-impelling device.

Another major object of the present invention is to provide a fish unloading system of the aforedescribed nature which is utilized to unload fish from auxiliary fish holds connected to the main fish hold through access hatches by progressively floating fish from the auxiliary fish holds into the main fish hold by means of a recirculating flow of water from the main fish hold through the auxiliary fish holds and back into the main fish hold, with the fish from the auxiliary fish holds then being unloaded from the main fish hold.

It is another object of the present invention to provide a fish unloading system of the aforedescribed nature wherein a pump is arranged with its suction in communication with the fish-impelling device to positively attract fish into the fish-impelling device.

An additional object of the present invention is to provide a fish unloading system of the aforedescribed nature wherein the pump is utilized to effect water recirculation through the fish holds.

Yet a further object of the present invention is to provide a fish unloading system of the aforedescribed nature wherein the fish are automatically restrained from clogging the suction of the pump.

Another object of the present invention is to provide a fish unloading system of the immediately aforedescribed nature utilizing a controllable water jet for expediting movement of fish from one hold to another through the access hatches into the main fish hold.

Yet another object of the present invention is to provide a fish unloading system of the aforedescribed nature that is economical to operate, foolproof in operation and may be employed with fishing vessels of conventional construction.

BRIEF DESCRIPTION OF THE DRAWINGS

FIG. 1 is a perspective view of a preferred form of fish unloading system embodying the present invention;

FIG. 2 is a broken horizontally exploded perspective view of a fish-impeller device and pump suction manifold utilized with the fish unloading system of the present invention;

FIG. 3 is a broken side elevational view of said fish-impeller device and pump suction manifold in operating condition;

FIG. 4 is a broken vertical sectional view showing a gate which may be employed with said fish unloading system, the gate being shown in its closed position;

FIG. 5 is a view similar to FIG. 4, but showing the gate moving towards an open position;

FIG. 6 is a view similar to FIGS. 4 and 5, but showing the gate in its completely open position;

FIG. 7 is an enlarged broken vertical sectional view of a seal utilized with the gate of FIGS. 4, 5 and 6;

FIG. 8 is a broken vertical sectional view taken in enlarged scale along lines 8—8 of FIG. 1;

DESCRIPTION OF THE PREFERRED EMBODIMENT

Figure 11:
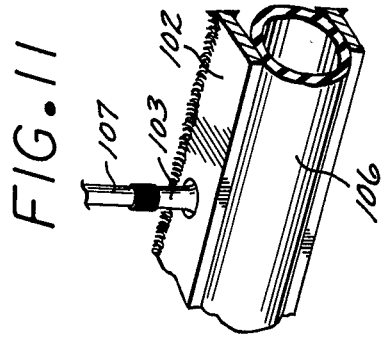
FIG. 11 is an enlarged perspective view of a gate seal tube.

Referring to the drawings, and particularly FIG. 1 thereof, there is shown a fishing boat B provided with a preferred form of improved fish unloading system embodying the present invention. This system utilizes a self-feeding, hopper-like fish-impelling device D shown extending through the main deck hatch 10 and the main fish hold hatch 12 of the fishing boat. The upwardly opening hatches 10 and 12 lead to a main fish hold 14 of the boat B. Fish F are shown being withdrawn upwardly from water or brine 16 in the lower portion of hold 14 through the hatches 10 and 12 onto the main deck 18 of the boat B by a fish-impelling device D. A pump P mounted on tween deck 20 is provided with a suction conduit 22 and a discharge conduit 24. Suction conduit 22 is connected to a manifold, generally designated 26, secured to the lower portion of fish-impelling device D so as to draw water or brine 16 and hence fish F into the confines of such device.

A preferred form of fish-impelling device D is disclosed in my U.S. Pat. No. 3,775,890. Such fish-impelling device D includes an open-sided enclosure, generally designated 40, that defines an elongated loop having a generally vertically extending main body 41 that merges into a laterally offset upper portion 42 that extends towards the lower end of a power-driven fish chute or conveyor C which extends upwardly from the main deck 18. A preferred form of chute or conveyor C is disclosed in my co-pending U.S. patent application Ser. No. 583,282, filed June 3, 1975. A connector chute 44 is pivotally connected to the laterally offset portion 42 of enclosure 40 to direct fish from a fish discharge aperture 46 formed in laterally offset portion 42 onto the lower portion of the chute C. Fish-impelling device D may be vertically adjustably supported by a bridle 47 attached to the upper portion of enclosure 40. As described more fully in my aforementioned U.S. Pat. No. 3,775,890, a pair of chains (not shown) are looped about the interior of the enclosure 40. Such chains are connected to a conventional hydraulic drive motor 50 secured to the upper portion of the enclosure 40. The chains are drivingly connected to a plurality of blades or baskets 52 of like construction whereby such blades or baskets will be moved about a closed path defined by the inner walls of the enclosure 40.

With continued reference to FIG. 1 and additionally referring to FIGS. 2 and 3, the lower portion of enclosure 40 is formed with a plurality of vertically extending slots 54 along the wall 56 thereof along which the blades or baskets 52 move upwardly. These slots 54 exteriorly of wall 56 are covered by the manifold 26. Manifold 26 includes a generally rectangular mounting frame 58 which is secured to the enclosure 40 as by bolt and nut combinations 60, shown particularly in FIG. 3. A semicylindrical chamber 64 is encompassed by the frame 58. The upper end of the chamber 64 is connected to the lower end of the suction conduit 22.

Referring again to FIG. 1, suction conduit 22 is preferably flexible, as is discharge conduit 24. Pump P is preferably of the centrifugal type driven by a suitable hydraulic or electric motor 70. The opposite end of the discharge conduit 24 is connected to the upper end of a water jet member J. A bypass discharge conduit 25 and bypass valve 71 are also mounted to pump P for a purpose to be described hereinafter.

Water jet member J includes a vertically extending pipe 72 which is vertically slidably supported within a vertical sleeve 74 of a mounting clamp 76. A set screw 78 is carried by the sleeve 74 to permit the pipe 72 to be vertically selectively positioned relative to tween deck 20. The mounting clamp 76 is provided with a set screw 79 which permits the water jet member J to be selectively removably affixed to fish hold hatch coaming 80 disposed within any of the fish hatches of the fishing boat B. A control wheel 84 is keyed to the upper portion of the pipe 72 for effecting rotation thereof about a vertical axis. A nozzle 86 is pivotally secured to the lower end of pipe 72 for adjustment about a horizontal axis. A control rod 88 is pivotally connected at its lower end to the nozzle 86 with the upper portion of such control rod being slidably supported by a guide 90 formed on the control wheel 84. The discharge end of discharge conduit 24 is connected to the upper end of pipe 72 by a conventional quick-disconnect type coupling.

Figure 10:
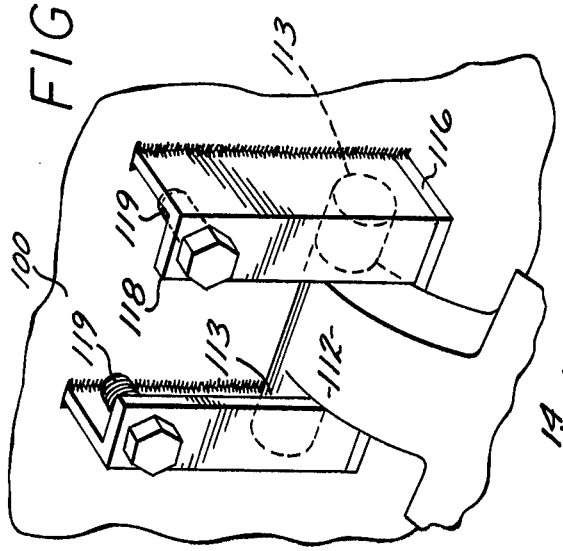
FIG. 10 is an enlarged perspective view of a gate hinge.
Figure 9:
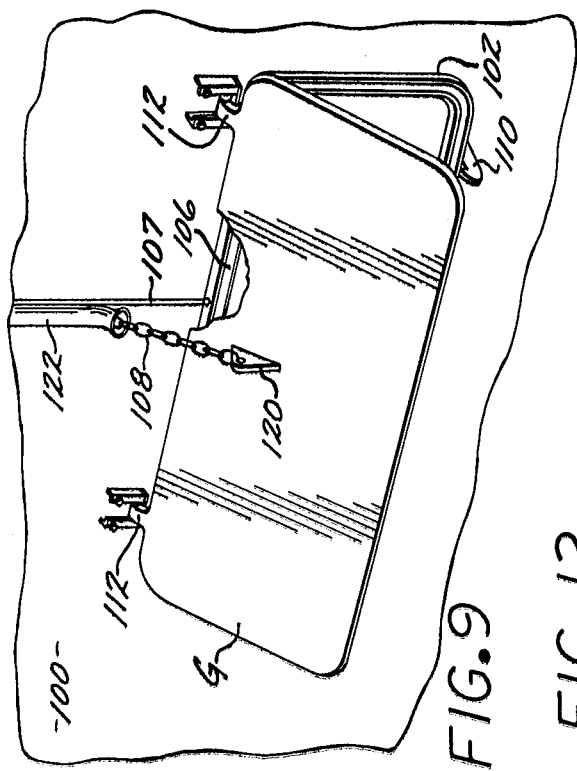
FIG. 9 is a perspective view of one of said gates.

Fishing boat B includes a plurality of longitudinally aligned fish holds in addition to main fish hold 14 and connected to the main fish hold. Shown in FIG. 1 are fish holds 92, 94, 14 and 96. Fish holds 92, 94, 14 and 96 are respectively separated by bulkheads 98, 99 and 100. Each of these bulkheads is formed with a like, generally rectangular, vertically extending access hatch, such hatches being designated 101 in FIG. 1. Each of the access hatches 101 is provided with a like gate G for controlling flow of water and fish therethrough. Referring particularly to FIGS. 4 through 8 and 11, each hatch 101 is formed about its periphery with a seal channel 102 (FIG. 11) which receives a pneumatic seal tube 106 formed of resilient material and having a stem 103. Through stem 103 the interior of seal tube 106 is in communication with a source of pressurized air (not shown) by a hose 107. Gate G is movable between its open and closed positions of FIGS. 4 and 6 by means of a chain 108. The lower end of gate G is received by a pair of locking brackets 110. The upper end of gate G is formed with a pair of support sliding T-hinges 112. The bifurcations 113 of the sliding T-hinges 112 are retained within a support box 116, such T-hinges extending through a vertical slot 118 formed in each such support box. Bolts 119 at the upper end of slot 118 limit upward movement of the hinges 112 (FIG. 10). Chain 108 extends upwardly from an ear 120 formed at the midportion of gate G through a vertically extending chain pipe 122. The upper end of the chain pipe 122 is in communication with a housing 124 positioned in tween deck 20 as shown in FIG. 8.

Referring particularly to FIG. 4, with the gate G in its lowermost closed position the seal tube 106 is maintained pressurized and therefore expanded against the rear surface of the gate. A water-tight seal is thereby provided. When it is desired to open gate G, air is released through the upper end of hose 107 and chain 108 is pulled upwardly, as by means of a manipulating loop 126 shown in FIGS. 1 and 8. Initial upward movement of gate G lifts its lower end out of the locking brackets 110, the sliding T-hinges 112 sliding within slots 118 during such upward gate movement. When the enlargements 114 of sliding T-hinges 112 engage the upper end of their support boxes 116, continued upward movement of the upper end of gate G is prevented and instead the lower end of the gate pivots upwardly until the gate reaches its completely open position of FIG. 6. Referring to FIG. 8, the manipulating loop 126 is normally disposed within the housing 124. Access to such loop is provided by means of a threaded access plate 128. Access plate 128 is shown disposed in its protective position in FIG. 8 and in a position removed from the housing 124 in FIG. 1. A chain lock 129 is mounted in housing 124 to retain chain 108 in its raised position of FIG. 6. It is important to note that the gates G may be opened and closed from the tween deck 20, and hence it is not necessary to send a workman into the fish holds. When chains 108 are released, gate G will pivot downwardly until its lower end slides over locking brackets 110 whereupon the gate will automatically drop into its locked, closed position.

In the operation of the improved fish loading system of the present invention, normally all of the fish holds are initially filled with water or brine at the time the fishing boat B is to be unloaded. It is not necessary to pump out such water or brine. It may, however, be necessary to adjust the salinity of the water or brine until the fish F are capable of floating near the water level in the holds. The fishing boat's normal brine pumps (not shown) may be operated to circulate the brine water so as to accelerate salinity if desired. Normally, all of the gates G will remain closed during this initial step of the operation. Next, the lower portion of the fish-impelling device D is lowered through hatches 10 and 12 into the water or brine 16 within main fish hold 14, whereby the lower looped portion of enclosure 40 will define a fish intake 140.

The motor 50 of fish-impelling device D will then be operated so as to effect linear movement of the blades or baskets 52. As indicated by the directional arrows in FIGS. 1 and 3, the blades or baskets 52 move downwardly along the wall of enclosure 40 opposite suction manifold 26 and upwardly along the enclosure wall 141 (FIGS. 2 and 3) to which such suction manifold is attached. Motor 70 is then operated so as to drive pump P. Such pump operation will cause the water or brine 16 within hold 14 to be drawn through slots 54 of the fish-impelling device D. The movement of water 16 towards such slots will serve to continually draw the fish F floating in such water or brine towards the intake 140 of the fish-impelling device D and hence onto the upwardly moving blades or baskets 52, the upwardly facing surfaces of such blades or baskets defining fish-impelling surfaces 130 (FIG. 3) that extend generally normal to the enclosure wall 41. The fish F so transported upwardly by the blades or baskets 52 ultimately pass through the fish discharge aperture 146 onto chute 44 and then upon the lower portion of the power-operated fish conveyor C. In this manner, the fish will be rapidly and continuously removed from the hold 12. It should be particularly noted that the removal of the fish from the hold 12 will not damage the fish in any way. The movement provided by the blades or baskets 52 is smooth and gentle so that the fish will not be bruised.

Referring now to FIG. 3, it is important to note that the upwardly moving blades or baskets 52 will constantly remove fish from the area forwardly of the slots 54. Hence, such slots cannot become clogged.

The discharge conduit 24 preferably will be arranged to pump the water or brine from main fish hold 14 to a location not in communication with such hold, such as a separate holding tank (not shown). This function may be accomplished by means of the bypass valve and bypass discharge passage 25 shown in FIG. 1. Alternatively, the normal brine handling equipment (not shown) of the fishing boat B may be used to control the water level in hold 14. The level of water or brine, and hence of fish within main fold 14, is gradually lowered as the fish-impelling device D progressively removes fish from within such hold. When the water level within main fish hold 14 falls to an elevation adjacent the level of the access hatches 101 connecting main fish hold 14 with adjoining fish holds 94 and 100 the gates G on such hatches will then be raised out of their locking brackets 110 as indicated in FIG. 5. At this time, the weight of fish contained in holds 94 and 100 will cause the gates G to pivot towards an open position. The gates will then be raised to their completely open position of FIG. 6 by means of chains 108. It should be particularly noted that the gates G may be opened and closed from the tween deck 20 and hence it is not necessary for workmen to enter the fish holds in order to actuate such gates. Assuming the water level within fish holds 94 and 100 is higher than the access hatches 101, such water will rush into main fish hold 14 carrying with it many of the fish contained within holds 94 and 100. Fish entering the main fish hold 14 from the auxiliary fish holds will, of course, be removed by the fish-impelling device D.

The water level within fish holds 94 and 100 will be dropped until it is intermediate the level of the access hatches 101 connecting fish holds 94 and 100 with the auxiliary fish holds adjacent thereto. The gates G connecting such auxiliary fish holds will then be opened and fish from the adjacent fish holds will enter fish holds 94 and 100. With continued reference to FIG. 1, fish may be flushed from any of the auxiliary fish holds through the access hatches 101 by means of water jet member J. In this regard, discharge conduit 24 will serve to direct water or brine from the pump P through the nozzle 86 of the water jet member towards the fish to be removed from access hatch 92, for example. The height and angular position of the nozzle 86 can be controlled by means of the control wheel 84 and the control rod 88. It should also be noted that the water jet member J may be readily moved from one fish hatch to another by means of its mounting clamp 76.

Figure 12:
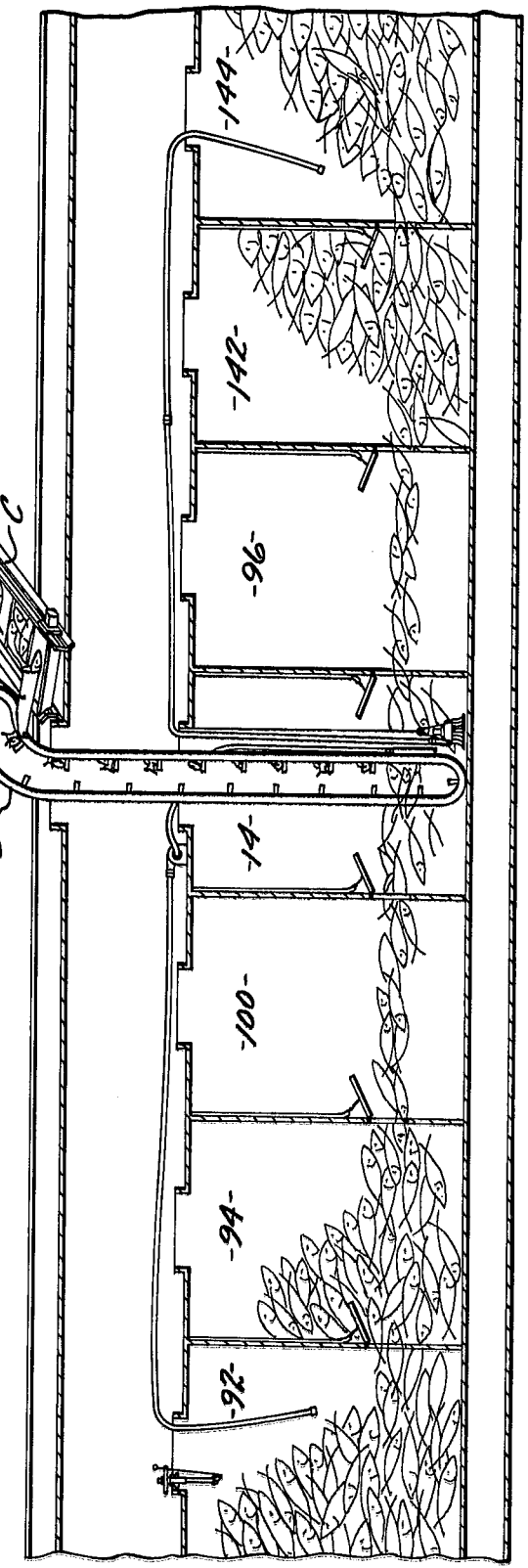
FIG. 12 is a generally schematic view showing fish being floated from the auxiliary fish holds into the main fish hold by recirculating water.

Referring now to FIG. 12, such Figure represents a generally schematic view showing how the fish are floated from the auxiliary fish holds of fishing boat B into main fish hold 14 by continually recirculating water or brine from the main fish hold 14 through the auxiliary fish holds towards the main fish hold and back in the auxiliary fish holds. Thus, with fish-impelling device D in operation removing fish from main fish hold 14, the level of water or brine in the main fish hold, as well as the auxiliary fish holds 92, 94, 100, 96, 142 and 144 is maintained somewhat above the lower edge of the access hatches 101. It should be understood other auxiliary fish holds may be provided fore and aft of holds 92 and 144. Water or brine from the lower portion of the main fish hold 14 is transferred by pump P through suction and discharge conduits 22 and 24, respectively, to auxiliary fish hold 92 remote from the main fish hold 14. Concurrently, a conventional submersible pump S is shown pumping water from main fish hold 14 into auxiliary fish hold 144 remote from the main fish hold by means of a flexible conduit 146. The amount of water circulated by pumps P and S should be sufficient to create a recirculating rapid flow of water or brine from the outermost auxiliary fish holds 92 and 144 through the intermediate fish holds 94, 100, 142 and 96 into the main fish hold 14 and back into the outermost fish holds whereby such rapidly circulating water will float the fish contained within the lower portions of the auxiliary fish holds through the access hatches 101 into the main fish hold 14 for progressive removal by the fish-impelling device D. It should be understood that during this recirculating operation water jet member J may be selectively inserted within any of the auxiliary fish holds to assist in removing any fish jams and the forcing of fish through the access hatches. It is only necessary to selectively connect the conduits 24 or 146 with such water jet member. The fish floating operation will be continued until all or substantially all of the fish have been transferred to main fish hold 14. If necessary, any remaining fish can be manually removed from the fish holds.

It will be clear from the foregoing description that the fish unloading system of the present invention permits a fishing boat to be unloaded rapidly as compared to existing fish unloading methods, with a minimum expenditure of labor and minimum damage to the fish being unloaded.

It will also be apparent that various modifications and changes may be made with respect to the foregoing detailed description without departing from the spirit of the present invention.

I claim:

1. A system of unloading fish from the main fish hold and auxiliary fish holds of a fishing boat through an upwardly opening main fish hold hatch, said auxiliary fish holds being connected to said main fish hold by vertically extending access hatches, said system comprising:

maintaining water in said holds at a level intermediate the elevation of said access hatches;

positioning a generally vertically extending power-driven fish-impelling device within said main fish hold with its lower portion submerged in said water, said fish-impelling device receiving fish at its lower submerged portion and discharging said fish without water upwardly through said main fish hold hatch; and continually recirculating said water from said main fish hold through said auxiliary fish holds towards said main fish hold and back into said auxiliary fish holds so as to progressively float fish from said auxiliary fish holds through said access hatches into said main fish hold for removal by said fish-impelling device.

2. A system as set forth in claim 1, wherein the salinity of said water is adjusted to cause the fish to float near the level of said water.

3. A system as set forth in claim 2, wherein said access hatches are provided with gates and said fish are removed from said main fish hold to a level approximate the level of said access hatches with said gates closed whereafter said gates are opened to place said auxiliary fish holds in communication with said main fish hold.

4. A system as set forth in claim 1, wherein said access hatches are provided with gates and said fish are removed from said main fish hold to a level approximate the level of said access hatches with said gates closed whereafter said gates are opened to place said auxiliary fish holds in communication with said main fish hold.

5. A system as set forth in claim 1, wherein said water is recirculated by pump means having its suction disposed within said main fish hold and its discharge connected to the auxiliary fish hold remote from said main fish hold.

6. A system of unloading fish from a fishing boat having a first hold provided with an unloading hatch and a second hold connected to said first hold by an access hatch, provided with a gate, said system comprising:

maintaining water in both of said holds with said gate closed;

positioning a generally vertically extending power-driven fish-impelling device within said first hold, with its lower portion submerged in the water in said first hold, said fish-impelling device receiving fish at its lower portion and discharging such fish upwardly through said unloading hatch;

disposing the suction of a pump at the lower portion of said fish-impelling device to continuously draw water and fish towards and into said lower portion to thereby progressively urge fish upwardly out of said hold and through said unloading hatch;

opening said gate; and introducing the discharge of said pump into said second hold whereby water from said first hold is recirculated from said second hold back into said first hold.

7. A system as set forth in claim 6, wherein said gate is not opened until the water level within said first hold has fallen to a level intermediate the elevation of said access hatch.

8. A system as set forth in claim 7, wherein said fish-impelling device includes a plurality of continuously linearly moving fish-impelling surfaces which follow an endless looped path extending between said hold and said hatch, with a part of said path being defined by a wall over which said fish-impelling surfaces move, and with the suction of said pump being connected to a section of said wall over which said fish-impelling surfaces pass, whereby said surfaces constantly remove fish drawn into the vicinity of said wall section.

9. A system as set forth in claim 6, wherein the water discharge from said pump is selectively directed onto fish contained within said second hold to urge such fish towards and through said access hatch.

10. A system as set forth in claim 9, wherein said fish-impelling device includes a plurality of continuously linearly moving fish-impelling surfaces which follow an endless looped path extending between said hold and said hatch, with a part of said path being defined by a wall over which said fish-impelling surfaces move, and with the suction of said pump being connected to a section of said wall over which said fish-impelling surfaces pass, whereby said surfaces constantly remove fish drawn into the vicinity of said wall section.

11. A system as set forth in claim 6, wherein said fish-impelling device includes a plurality of continuously linearly moving fish-impelling surfaces which follow an endless looped path extending between said hold and said hatch, with a part of said path being defined by a wall over which said fish-impelling surfaces move, and with the suction of said pump being connected to a section of said wall over which said fish-impelling surfaces pass, whereby said surfaces constantly remove fish drawn into the vicinity of said wall section.

12. A system as set forth in claim 6, wherein the salinity of said water is adjusted to cause the fish to float near the level of said water.

13. A system of unloading fish from a hold of a fishing boat through a hatch thereof, said system comprising:

maintaining water within said hold;

positioning a generally vertically extending power-driven fish-impelling device within said hold, with its lower portion submerged in said water, said fish-impelling device receiving said fish at its submerged lower portion and discharging said fish upwardly through said hatch, with said device including a plurality of continuously linearly moving fish-impelling surfaces which follow an endless looped path extending between said hold and said hatch, a part of said path being defined by a wall over which said fish-impelling surfaces move;

connecting the suction of a pump to the lower portion of said fish-impelling device at a section of said wall over which said fish-impelling surfaces pass to continuously draw said water and fish towards said section of said wall whereby said surfaces constantly remove fish drawn into the vicinity of said wall section by progressively urging said fish upwardly out of said hold and through said hatch.

14. A system as set forth in claim 13, wherein the salinity of said water is adjusted to cause said fish to float near the level of said water.

* * * * *